G. A. ROSSITER.
GYROSCOPIC COMPASS.
APPLICATION FILED MAY 20, 1918.

1,386,029.

Patented Aug. 2, 1921.
2 SHEETS—SHEET 1.

INVENTOR
Geo. A. Rossiter, by
ATTORNEY

G. A. ROSSITER.
GYROSCOPIC COMPASS.
APPLICATION FILED MAY 20, 1918.

1,386,029.

Patented Aug. 2, 1921.
2 SHEETS—SHEET 2.

INVENTOR
Geo. A. Rossiter, by
F. U. Witherspoon
ATTORNEY

UNITED STATES PATENT OFFICE.

GEORGE A. ROSSITER, OF BROOKLYN, NEW YORK, ASSIGNOR TO THE CARRIE GYROSCOPIC CORPORATION, OF NEW YORK, N. Y., A CORPORATION OF NEW YORK.

GYROSCOPIC COMPASS.

1,386,029.  Specification of Letters Patent.  Patented Aug. 2, 1921.

Application filed May 20, 1918. Serial No. 235,589.

*To all whom it may concern:*

Be it known that I, GEORGE A. ROSSITER, a citizen of the United States, residing at Brooklyn, in the county of Kings and State of New York, have invented certain new and useful Improvements in Gyroscopic Compasses; and I do hereby declare the following to be a full, clear, and exact description of the invention, such as will enable others skilled in the art to which it appertains to make and use the same.

This invention relates to gyroscopic compasses, and has for its object to simplify the construction of these compasses without destroying the efficiency thereof.

With this and other objects in view the invention consists in the novel combinations of parts hereinafter more fully disclosed and particularly pointed out in the claims.

Referring to the accompanying drawings forming a part of this specification in which like numerals designate like parts in all the views.

Figure 4:
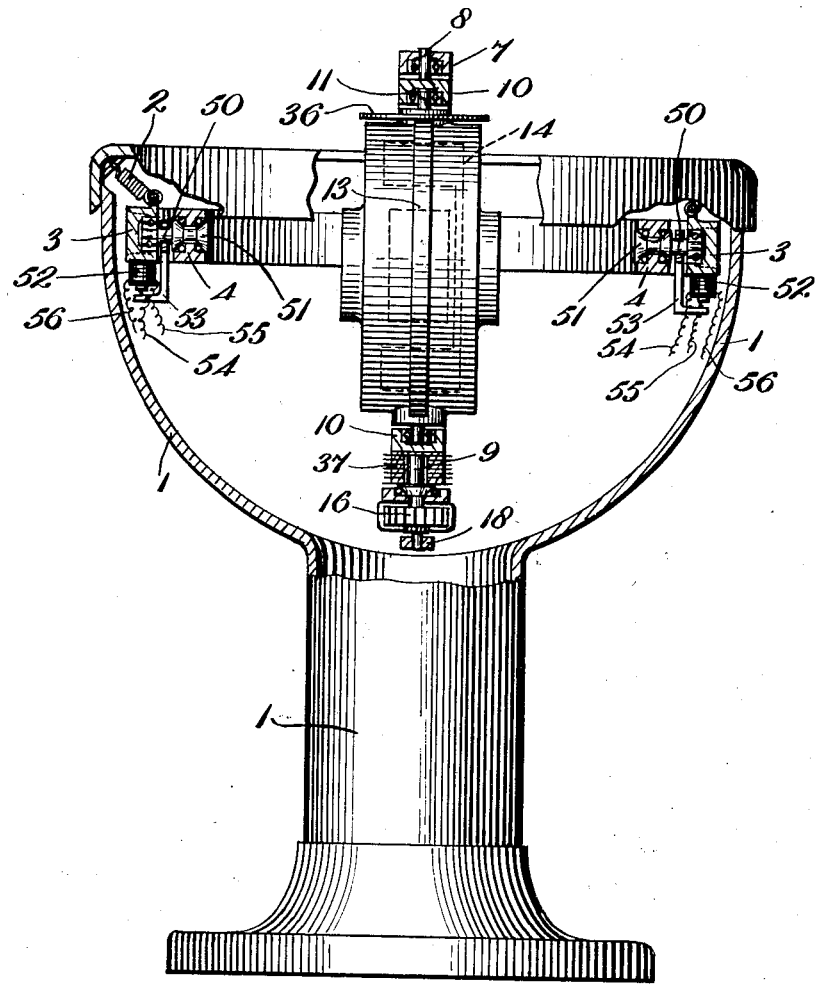
Fig. 4, is a view taken at right angles to the plane of Fig. 1.

1 indicates the binnacle frame, which may be of any suitable construction; 2 a plurality of springs supported from said frame; 3 an outer gimbal or Cardan ring supported from said springs; 4 an inner gimbal or Cardan ring located inside the ring 3, and supported therefrom by the usual gimbal trunnions 50, see Fig. 4. Said ring 4 is provided with bearings located 180° apart, through which pass the trunnions 5 mounted in ball bearings as illustrated, and having the common axis 6 indicated in dotted lines. On the inner ends of said trunnions 5, is supported the carrying frame 7 as shown, which at points located at 90° on each side of said trunnions in the vertical plane is provided with ball bearings to receive the vertically disposed pivots 8 and 9 rigid with the shadow, or follow up ring 10. Said shadow ring 10, is in turn provided with ball bearings in the common axis of the pivots 8 and 9, to receive the vertically disposed pivots 11 and 12 rigid with the wheel casing 13, carrying the gyro-wheel 14, having its axis of rotation 15 located below the axis 6, as shown.

The axis 6 is so located as to be above the center of gravity of the system comprising the frame 7, the shadow ring 10, and the gyro wheel 14, thereby rendering this said system pendulous, as will be readily apparent. This has the effect of suppressing one of the degrees of freedom of the gyro wheel 14, namely, about the said axis 6, in a north and south direction, and the said wheel is therefore a wheel of two degrees of freedom, or what is called in this art, a weighted wheel.

The pivot 9 extends down through the outer supporting frame 7, and carries the rotor 16 of the motor 17, mounted on the bracket frame 18 carried by the frame 6.

Figures 1, 2, 3:
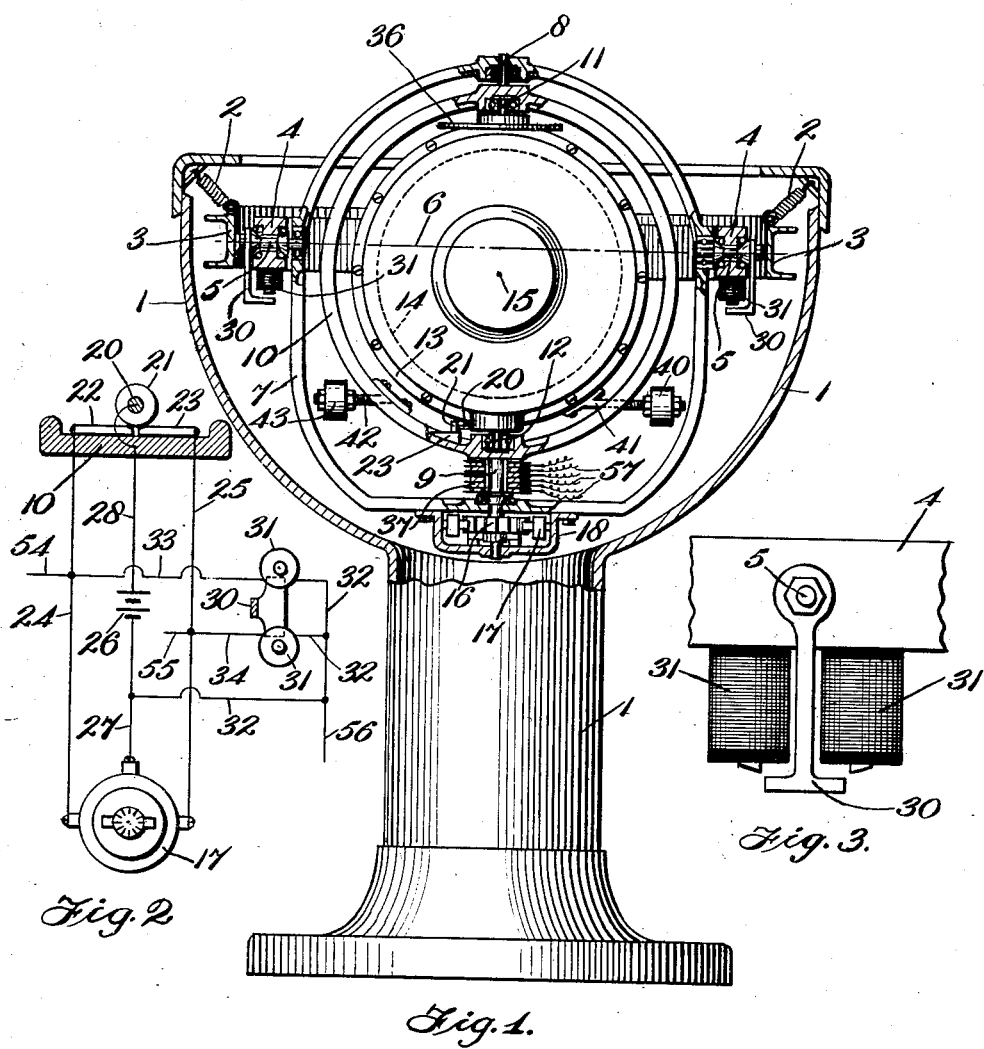
Figure 1 is an elevational view partly in section of a gyroscopic compass made in accordance with this invention.
Fig. 2 is a diagrammatic view illustrating a portion of the circuits.
Fig. 3, is a detail view showing the means for agitating the pivots.

The casing 13 is provided with an arm, or support 20, carrying a contact roller 21, adapted to make circuit with the contacts 22 or 23, see Fig. 2, according to the position of said casing 13, and said contacts are joined to the motor 17 as by the circuit wires 24 and 25 as shown. A source of current 26 is joined to said motor by the wire 27, and to said roller contact 21 by the wire 28. The electrical connections are such that when there is relative movement in azimuth between the casing 13 and the main frame 7, as for example, when the ship swings in azimuth, the motor 17 will move in the proper direction to maintain the shadow ring 10 always in the plane of the wheel. That is to say, when the casing 13 apparently turns in, say, a clockwise direction, as seen from above, due to movement of the ship in azimuth in a counter clockwise direction circuit through the motor will be made at contact 23, and the rotor 16 will turn in the same direction as the casing, carrying shadow or follow up ring 10 and contact 23 with it, and thus immediately breaking the circuit. Should the casing 13 continue its clockwise motion, circuit will be again made with said contact 23, the circuit will again be broken, and the shadow, or follow up ring 10, will again follow the apparent movement of the casing 13. This cycle will be repeated as long as casing 13 moves in its clockwise direction. Again, should said casing 13 apparently move in a counter clockwise direction, then roller 21 will make circuit through contact 22, the motion of rotor 16 will be reversed, shadow ring 10 will move in a counter clockwise direction, carrying contact 22 with it, and the circuit immediately broken. This last mentioned cycle will, also, be repeated as long as said casing 13 continues to move in a counter clockwise direction. Therefore, it becomes apparent that the shadow ring 10, will follow up each and every movement in azimuth of the casing 13, to the end that said casing and ring will always occupy substantially the same vertical plane, even though pressure be applied to said casing to turn it independently on its pivots 11 and 12. It will be observed that the field of the motor 17 is rigid with bracket 18, which is rigid with frame 7, which is connected to trunnions 5, carried by gimbal rings 4 and 3, carried by binnacle 1, rigid with the ship; so that it follows, that any magnetic force exerted by rotor 16 tending to rotate or move the field of motor 17 will be resisted through the connections and means just mentioned, and therefore said field may be considered as rigidly mounted with respect to said rotor. Nevertheless, it is equally apparent that if no current is passing through said motor the ship may freely turn in azimuth and carry the field coils with it. That is to say, suppose the ship turns in azimuth in a clockwise direction as seen from above, carrying the field coils of motor 17 with it, and suppose the rotor 16 at the same time is being turned in the same direction by reason of the circuit having been made at contact 23. The shadow ring 10 will function as above described, for the rotor will magnetically react against the moving field coils, and a relative rotation will take place until the circuit is broken precisely as if the field coils were at rest. The circuit being now broken, the field coils may continue their revolution around the rotor without exerting any action thereon, or if any residual magnetic attraction persists, they may drag the rotor with them to some extent. In the latter case, the casing 13 remaining stationary the circuit will be made through the contact 22, and the rotor will take up its motion in a counter clockwise direction and keep it up until the circuit is again broken, so that the azimuth of casing 13 is not disturbed in the least. A similar consideration will show that the position of said casing in azimuth will not be disturbed when the field coils are rotated in azimuth around the rotor in a counter clockwise direction. In other words, the turning of the ship in azimuth, at no time interferes with the directive action of the gyro-wheel and casing, nor with the proper functioning of the shadow ring 10.

Of course, it is well known that the operation of said shadow ring eliminates compass errors due to friction when the ship turns in azimuth, and therefore no detail explanation thereof is here made.

In order that the trunnions 5 may be substantially free from friction at all times under the trying conditions at sea, I have provided the outer ends of said trunnions with the armatures 30, and have supported the electro-magnets 31 from the ring 4, in an operative relation to said armatures. Said magnets are provided with the connections 32 joining wire 27 to the source of current 26, and also, with the wires 33 joining wire 24, and with wire 34 joining wire 25, so that as said roller 21 makes and breaks circuit with said contacts 22 and 23 it will cause said magnets to oscillate said trunnions in their bearings, and thus prevent their sticking.

As will be clear from Fig. 4, the outer gimbal ring 3, is likewise provided with trunnions 50 which are located 90° from the trunnions 5, and said trunnions 50 are received in ball bearings 51 carried by the inner ring 4. Mounted upon said ring 3, are other electro-magnets 52 having armatures 53 carried by said trunnions 50, and adapted to oscillate the latter precisely as the armatures 50 oscillate their trunnions 5. The coils of said magnets 52 are conveniently connected with the leads 54, 55 and 56 in Fig. 2. A compass card 36 may be located as shown or at any other convenient position. Current is brought into the system by means of the wires 57 and collector rings 37 carried by the pivot 9, or by any other convenient means.

It is well known if the axis of a weighted gyro-wheel is, when in a horizontal position, turned from the north point of the horizon so as to make an angle with the meridian, that the rotation of the earth will cause said axis to return to the true north, to pass beyond said point, to return again to and beyond the north point, and thus to oscillate on each side of said north point until its motions are dampened out through friction or by other means.

To make these facts clearer we may suppose that a horizontally disposed axis, such as 15 in Fig. 1, is so moved as to point north east and south west while the weighted wheel 14 is rotating in the same direction as the earth rotates. Let us also suppose that we are looking at the south end of the said axis, so that the earth and wheel are turning in a clockwise direction as seen in Fig. 1. A little consideration will show that since the rotating wheel will tend to maintain its original plane, its center of gravity will soon find itself outside the new vertical planes it successively reaches in space by the rotation of the earth, and that this displacement relative to said planes will have the effect of causing the north end of axis 15 to continuously rise until the north point is reached while the corresponding precession will move said north end of axis 15 continuously toward the west until, say, the northwest point is reached. A further consideration will show that after the north point has been thus reached the above mentioned relative displacement of the center of gravity of the wheel will be at its maximum, and the gravity couple thus produced, will exert such a tendency to bring the plane of the wheel into the vertical plane, that while the north end of axis 15 is moving from the north point to the north west point it will descend until the axis 15 finds itself again horizontal at said latter point. The center of gravity of the wheel 14, has now regained the vertical plane, and occupies its lowest position. But said axis 15 still makes an angle with the meridian, and the same consideration as before will show that the rotation of the earth will again displace said center of gravity relative to the successive new vertical planes it reaches in space, but this time the displacement is in a direction opposite to that first observed. It follows, that in its effort to again find its lowest position, the center of gravity of wheel 14 will now depress the north end of the axis 15 until the north point is reached, while precession will continuously move said north end until, say, the north east point is again reached. After the north point has thus again been reached, the center of gravity of the wheel has reached its maximum displacement, the gravity couple begins to turn the wheel 14 about axis 6 in an opposite direction, and said center of gravity again reaches its lowest point when the said north end again reaches the north east point, and axis 15 is again horizontal.

The swinging of the north end of the axis 15 on each side of the north point due to precession caused by the earth's rotation in the manner above disclosed, constitutes a serious objection to gyro compasses, and therefore, it is necessary to adopt some means to dampen out these oscillations.

In this invention, supposing we are looking at the south end of axis 15, in Fig. 1, I place in the lower right hand quadrant and in the east and west plane an adjustable weight 40 attached to the casing 13, as by the arm 41 as shown. In order to maintain a balance of the parts, I place in the same vertical and horizontal planes, as arm 41, the arm 42 attached to the shadow ring 10, and secure to said arm the adjustable weight 43. The weights 40 and 43 are so adjusted that the moments of the attached parts on each side of the pivot 9 are equal, and the arm 41 is slightly curved (not shown) to avoid contact with ring 10.

With the weights disposed as described, should the south end of axis 15 be depressed in the manner above disclosed, said weight 40 would act to oppose said depression and also would produce a turning movement about the vertical axis and therefore would act to lessen any precession that accompanies said depression, with the result that, when the north pointing end of axis 15 reaches the true north, the center of gravity of the pendulous system has not turned about axis 6 as much as it would turn if weight 40 were absent.

But said center of gravity has, in fact, been displaced to a lesser extent, and will, therefore, cause said north end to pass the true north in its effort to find its lowest position. In this effort said center of gravity is aided by weight 40, which therefore, shortens the travel of said north end toward the west. In other words, a little consideration will show, that no matter what may be the conditions, the action of weight 40 will always be to oppose precession, and therefore, to dampen out any oscillations of the north end of axis 15 on each side of the true north.

From the foregoing, it will be clear that by adopting the construction shown I am enabled to greatly simplify the mechanism of a gyro-compass in that I am enabled to do away with the usual intermediate or vertical ring, its horizontal trunnions, and vertical pivots that has heretofore been located between the casing 13 and shadow ring 10. At the same time, by mounting said casing 13 directly on the pivot 12 and shadow ring 10, by mounting the shadow ring on the pivot 9 having the same axis as pivot 12, thereby causing the elevations and depressions of the wheel axis 15 to take place about the gimbal pivots 5 as centers, I am enabled to stabilize all pendulous parts in such a manner that the suspension system is maintained in such an equilibrium that it is not liable to be affected seriously by the rolling and pitching motions of the ship. In other words, when wheel 14 is rotating it is pendulous only in an east and west plane, about the trunnions 50.

It follows from this that I have by the foregoing mechanism stabilized the supports, or bearings, on which the directive wheel turns in azimuth by its own gyroscopic force; that since my gyro compass supports, or carrying members are stabilized by the directive action of the gyro wheel, in their normal positions, in all planes except the east and west plane, I have provided a means for preventing errors in compass readings caused by the rolling and pitching movements of the ship without employing the special devices heretofore utilized for this purpose; that the weight 40 on the directive member 13 counterbalances in an east and west plane the weight 43 on the follow up ring 10, so that these two weights effectually and automatically dampen out any persistent oscillations of the compass card due to precessional or other movements, and afford what might almost be called a dead beat reading of the card under normal conditions.

It is obvious that those skilled in the art may vary the details of construction as well as the arrangement of parts without departing from the spirit of the invention and, therefore, I do not wish to be limited to the above disclosure, except as may be required by the claims.

What I claim is:—

1. In a gyro compass adapted for use aboard a moving vessel the combination of a gyroscopic directive element; a casing in which said element is pivoted for rotation; a pendulous supporting frame; means for horizontally pivoting said frame; a shadow ring vertically pivoted in said supporting frame; means for vertically pivoting said casing in said shadow ring, whereby one of the degrees of freedom of said element is suppressed; and means carried by said casing adapted to dampen out oscillations of said element about the north point, substantially as described.

2. In a gyroscopic compass the combination of a gyro-wheel; a support for said wheel; a shadow ring; means for vertically pivoting said support in said ring; and means carried by said support adapted to dampen out oscillations of the wheel axis about the north point, substantially as described.

3. In a gyroscopic compass the combination of a gyro wheel; a casing for said wheel; a shadow ring in which said casing is vertically pivoted; and a weight carried by said casing adjustable in a plane substantially at right angles to the spinning axis of said wheel, and adapted to produce a torque about said vertical axis to dampen out oscillations of said element about the north point, substantially as described.

4. In a gyroscopic compass the combination of a gyro-wheel; a casing for said wheel; an adjustable dampening weight carried by said casing; a shadow ring and pivotal connections associated with said casing; and an adjustable counter balancing weight carried by said shadow ring, substantially as described.

5. In a gyroscopic compass the combination of a gyro-wheel; a casing for said wheel; vertical pivots for said casing; a shadow ring receiving said pivots; vertical pivots for said shadow ring; a supporting frame receiving said last named pivots; a motor carried by said ring and frame; and means carried by said casing for dampening oscillations of the wheel axis about the north point, substantially as described.

6. In a gyroscopic compass the combination of a gyro-wheel; a casing for said wheel; vertical pivots for said casing; a shadow ring receiving said pivots; vertical pivots for said shadow ring; a supporting frame receiving said last named pivots; horizontal pivots for said frame; means to agitate said last named pivots; a motor carried by said ring and frame; and means carried by said casing for dampening oscillations of the wheel axis about the north point, substantially as described.

7. In a gyroscopic compass the combination of a gyro-wheel; a casing for said wheel provided with vertical pivots; a shadow ring directly receiving the pivots of said casing; means carried by said casing adapted to dampen out oscillations of the same about said pivots; a supporting frame; an inner gimbal ring in which said frame is horizontally pivoted; an outer gimbal ring in which said inner ring is pivoted; and means for agitating said last named pivots, substantially as described.

8. In a gyroscopic compass the combination of a directive element; a shadow ring in which said element is directly and vertically pivoted; means for causing said shadow ring to maintain a predetermined plane with respect to said directive element; and means for pivotally supporting said shadow ring, substantially as described.

9. In a gyroscopic compass the combination of a directive element; a shadow ring in which said element is directly and vertically pivoted; means for causing said shadow ring to maintain a predetermined plane with respect to said directive element; and means comprising a supporting frame and a gimbal ring for pivotally supporting said shadow ring, substantially as described.

10. In a gyroscopic compass the combination of a directive element; a shadow ring in which said element is directly and vertically pivoted; means for automatically maintaining said shadow ring in the plane of said directive element; and means comprising a horizontally pivoted frame and gimbal rings for pivotally supporting said shadow ring, substantially as described.

11. In a gyroscopic compass for use on an unsteady platform the combination of a gyro directive element; and supporting means in which said element is vertically pivoted adapted to be stabilized against rolling and pitching movements of said platform by the gyroscopic action of said element, and means for causing said supporting means to maintain a predetermined plane with respect to said directive element, substantially as described.

12. In a gyroscopic compass the combination of a directive gyro wheel; supporting means to which said wheel is directly pivoted for movement about a substantially vertical axis, whereby said means are stabilized in all planes except the east and west plane, when in their normal positions by the gyroscopic action of said wheel, and means for causing said supporting means to maintain a predetermined plane with respect to said directive element, substantially as described.

13. In a dampening means for gyroscopic compasses, the combination of a directive member; a follow up member associated with said directive member; a weight carried by said directive member adapted to dampen persistent oscillations of the compass and due to precessional movements; and a counter weight carried by said follow up member normally located in the same east and west plane as first named weight, substantially as described.

In testimony whereof I affix my signature in presence of two witnesses.

GEORGE A. ROSSITER.

Witnesses:
ALICE E. MILLAR,
HENRY MEISOLL.